United States Patent
Gordon (10) Patent No.: US 10,021,373 B2
(45) Date of Patent: Jul. 10, 2018

(54) DISTRIBUTING VIDEO AMONG MULTIPLE DISPLAY ZONES

(71) Applicant: Microsoft Technology Licensing, LLC, Redmond, WA (US)

(72) Inventor: John C. Gordon, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 149 days.

(21) Appl. No.: 14/992,685

(22) Filed: Jan. 11, 2016

(65) Prior Publication Data

US 2017/0201740 A1 Jul. 13, 2017

(51) Int. Cl.
| | |
|---|---|
| *H04N 5/775* | (2006.01) |
| *H04N 13/02* | (2006.01) |
| *G06T 19/00* | (2011.01) |
| *H04N 13/04* | (2006.01) |
| *G06F 3/14* | (2006.01) |

(Continued)

(52) U.S. Cl.
CPC ......... *H04N 13/0278* (2013.01); *G06F 3/012* (2013.01); *G06F 3/013* (2013.01); *G06F 3/0325* (2013.01); *G06F 3/1446* (2013.01); *G06T 19/006* (2013.01); *H04N 13/0203* (2013.01); *H04N 13/0246* (2013.01); *H04N 13/0425* (2013.01); *H04N 13/0445* (2013.01); *H04N 13/0484* (2013.01); *G09G 2300/026* (2013.01);

(Continued)

(58) Field of Classification Search
None
See application file for complete search history.

(56) References Cited

U.S. PATENT DOCUMENTS

| | | |
|---|---|---|
| 7,091,926 B2 | 8/2006 | Kulas |
| 7,312,764 B2 | 12/2007 | Driver et al. |

(Continued)

FOREIGN PATENT DOCUMENTS

| | | |
|---|---|---|
| EP | 1396781 A2 | 3/2004 |
| WO | 2011044936 A1 | 4/2011 |

OTHER PUBLICATIONS

Bowman, et al., "Empirical Comparisons of Virtual Environment Displays", In Technical Report TR01-19 of Virginia Polytechnic Institute & State University, May 17, 2003, pp. 1-18.

(Continued)

*Primary Examiner* — Eileen M Adams
(74) *Attorney, Agent, or Firm* — Alleman Hall Creasman & Tuttle LLP (57) ABSTRACT

A method for distributing video in a display system equipped with at least one camera. The video is distributed among multiple display zones, which are movable with respect to each other. The method includes acquiring optically, with the camera, a calibration image of a display zone of a display-enabled electronic device. The method includes computing, based on the calibration image, a coordinate transform responsive to dimensions, position, and orientation of the display zone relative to the camera, the coordinate transform being usable to effect video rendering on the display zone. The method includes transmitting to the display-enabled electronic device one or more of the coordinate transform and video rendered for display on the display zone based on the coordinate transform.

20 Claims, 6 Drawing Sheets

(51) Int. Cl.
   *G06F 3/01* (2006.01)
   *G06F 3/03* (2006.01)
(52) U.S. Cl.
   CPC . *G09G 2320/0261* (2013.01); *G09G 2356/00* (2013.01)

(56) References Cited

U.S. PATENT DOCUMENTS

| | | |
|---|---|---|
| 7,453,418 B2 | 11/2008 | Palmquist |
| 7,626,569 B2 | 12/2009 | Lanier |
| 8,253,649 B2 | 8/2012 | Imai et al. |
| 8,537,113 B2 | 9/2013 | Weising et al. |
| 8,730,127 B2 | 5/2014 | Pedro |
| 8,803,816 B2 | 8/2014 | Kilpatrick et al. |
| 2010/0128112 A1 | 5/2010 | Marti et al. |
| 2010/0329358 A1 | 12/2010 | Zhang et al. |
| 2011/0304700 A1* | 12/2011 | Ito .................. H04N 13/0011 348/47 |
| 2012/0120069 A1* | 5/2012 | Kodaira ............ G06F 17/30271 345/419 |
| 2013/0073388 A1* | 3/2013 | Heath .................. G06Q 30/02 705/14.53 |
| 2013/0176255 A1 | 7/2013 | Kim et al. |
| 2014/0193037 A1 | 7/2014 | Stitzinger et al. |
| 2014/0293017 A1 | 10/2014 | Fei et al. |
| 2014/0355819 A1 | 12/2014 | Naruse |
| 2016/0187662 A1* | 6/2016 | Sato .................. G02B 27/017 345/8 |
| 2017/0186146 A1* | 6/2017 | Raniwala ............ G06T 7/002 |

OTHER PUBLICATIONS

Andrews, et al., "Information Visualization on Large, High-Resolution Displays: Issues, Challenges, and Opportunities", In Journal of Information Visualization, vol. 10, Issue 4, Oct. 2011, pp. 341-355.

"Cave Automatic Virtual Environment", Retrieved on: Oct. 21, 2015. 5 pages. Available at: https://en.wikipedia.org/wiki/Cave_automatic_virtual_environment.

ISA European Patent Office, International Search Report and Written Opinion Issued in PCT Application No. PCT/US2016/068631, dated Mar. 22, 2017, WIPO, 11 Pages.

"Second Written Opinion Issued in PCT Application No. PCT/US2016/068631", dated Jan. 5, 2018, 5 Pages.

* cited by examiner

DISTRIBUTING VIDEO AMONG MULTIPLE DISPLAY ZONES

BACKGROUND

Many desktop computer users are familiar with 'extending the desktop' across two or more computer monitors. While this feature may help the user create a more comfortable working environment, it does not enable the user to visualize a 3D environment using conventional display hardware. Moreover, even the simple operation of extending a planar desktop across several monitors requires initial, manual set up by the user, and repeated adjustment every time a monitor is moved out of position. If this manual setup process were extended into three dimensions—with every monitor having independent and dynamically variable position, scale, and orientation—the configuration burden on the user would be significant.

SUMMARY

One aspect of this disclosure is directed to a method for distributing video in a display system equipped with at least one camera. The video is distributed among multiple display zones, which are movable with respect to each other. The method includes optically acquiring, with the camera, a calibration image of a display zone of a display-enabled electronic device. The method includes computing, based on the calibration image, a coordinate transform responsive to dimensions, position, and orientation of the display zone relative to the camera, the coordinate transform being usable to effect video rendering on the display zone. The method includes transmitting to the display-enabled electronic device one or more of the coordinate transform and video rendered for display on the display zone based on the coordinate transform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Configuring multiple display-rendering contexts in world space is a highly error-prone and manual process, which can be frustrating to the user. A familiar, if simplistic, example is multiple-display configuration in personal computer (PC) operating systems, where multiple displays are arranged like tiles on a wall. Not only does such tiling require initial manual configuration, and reconfiguration each time a monitor is moved, it also fails to support 'immersive' experiences.

The technology disclosed herein enables electronic devices in a display system to detect each other and to automatically model the relative position and orientation of each device in 3D world space. This supports an immersive experience in which display content is smoothly rendered across multiple displays as though they were windows into a virtual 3D world. More particularly, this technology enables two or more devices with front-facing cameras to automatically detect each other and track their relative orientations using display content as a broadcast signal, and using each of the cameras as a receiver. Devices arranged in proximity to each other can 'team up' to seamlessly produce a consistent user experience as though they were part of the same system. Projection surfaces, moreover, can automatically extend themselves, with integrated or associated cameras being used to capture the best possible image of a specific region of the environment, or to reconstruct depth information from regions with overlapping camera coverage.

Figure 1:
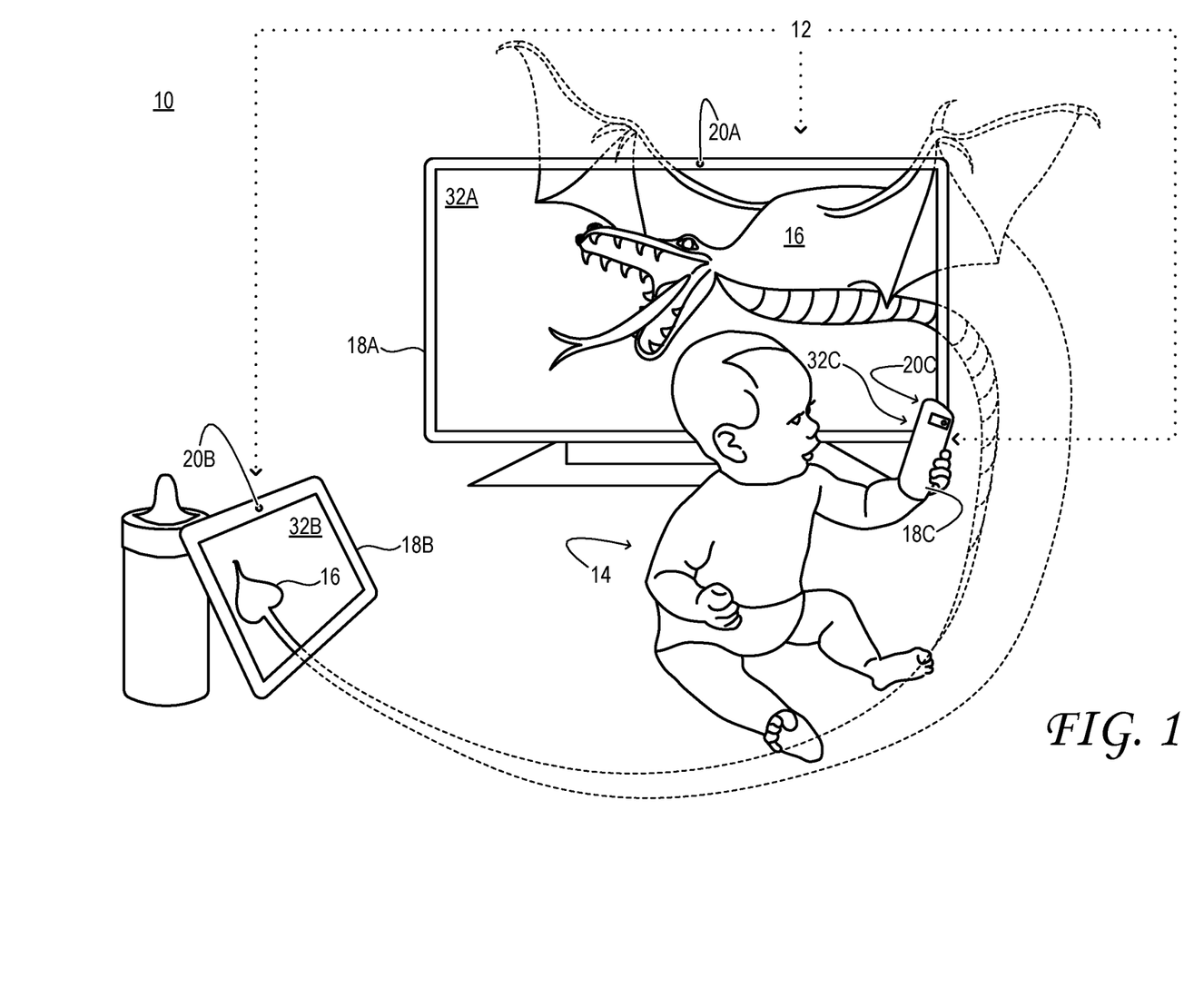
FIG. 1 shows aspects of an example display system for distributing video among multiple display zones movable with respect to each other.

FIG. 1 shows aspects of an example environment 10 in which video is displayed via display system 12. The display system is configured to distribute the video among multiple display zones in the environment. In FIG. 1 the environment is an interior living space in which a single user 14 is viewing the video. The video, in this case, includes a fantastic virtual-reality (VR) display image 16. In other scenarios, the environment may be an exterior space with two or more users. The video, likewise, is not particularly limited and may include realistic cinematic video, game video, or a graphical user interface (GUI) for a personal computer (PC), etc.

Display system 12 of FIG. 1 includes a plurality of separate electronic devices 18: electronic device 18A, electronic device 18B, and electronic device 18C. Other display-system implementations may include more or fewer electronic devices. Represented schematically in FIG. 2, each of the electronic devices 18 may include some or all of the following components: camera 20 (e.g., cameras 20A, 20B, 20C), display 22, compute machine 25, communication machine 26, video rendering machine 28, and loudspeaker 29. Example electronic devices of this kind include console game systems, desktop (e.g., all-in-one) PCs, laptop PCs, tablet computers, smartphones, handheld game systems, and near-eye holographic display systems, among others. Despite the utility of having both camera and display functionality in the same electronic device, some display-system implementations may include at least one electronic device having a camera but no display, and/or at least one electronic device having a display, but no camera. One non-limiting example of a suitable electronic device having a camera but no display is a peripheral machine-vision component, such as the Kinect®, from Microsoft Corporation of Redmond, Wash. One non-limiting example of a usable electronic device having a display but no camera is a peripheral display projector. Hereinafter, an electronic device having a camera is said to be 'camera-enabled'; an electronic device having a display is said to be 'display-enabled'; an electronic device having a loudspeaker is said to be 'audio-enabled'.

Figure 2:
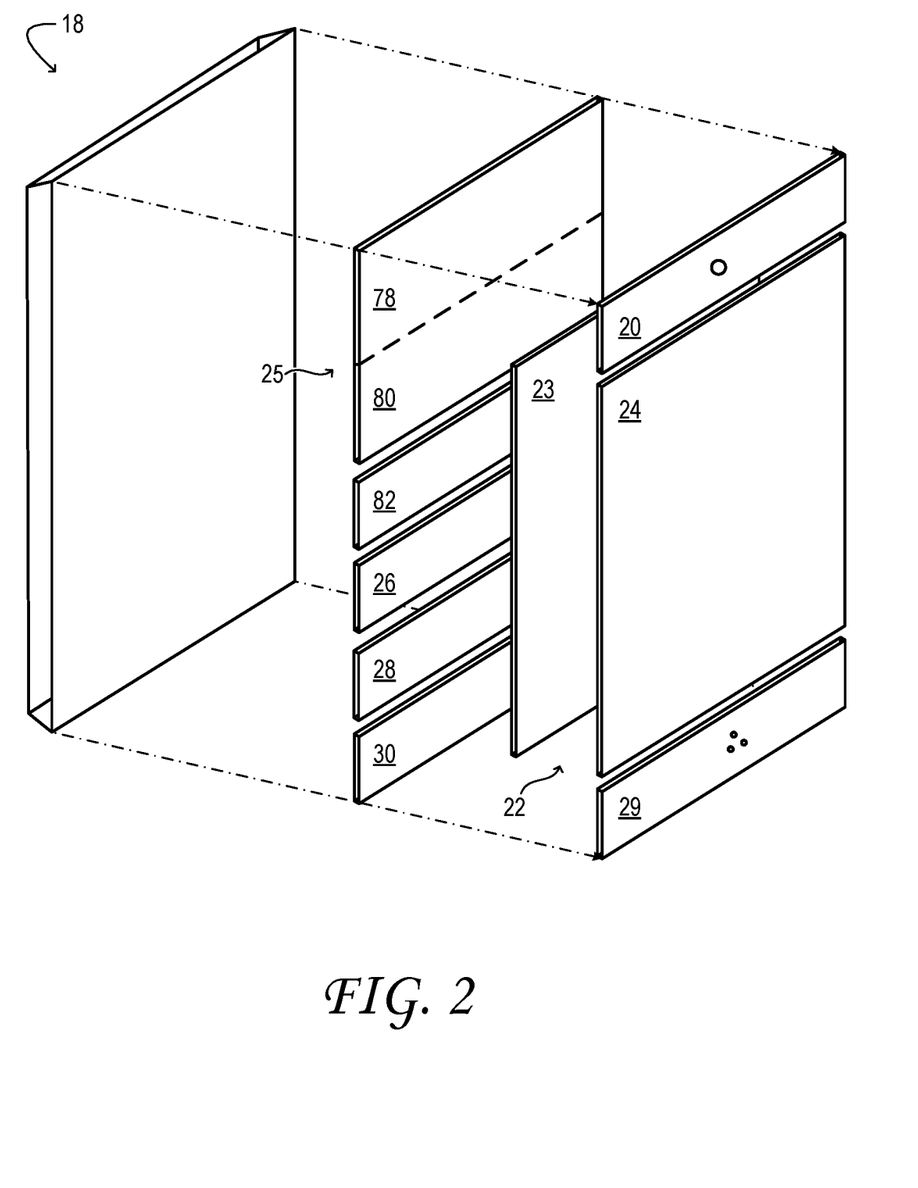
FIG. 2 shows aspects of an example display-enabled electronic device of a display system.

Continuing in FIG. 2, display 22 of electronic device 18 includes a backlight 23 and a liquid-crystal display (LCD)

matrix 24. The backlight may include an ensemble of light-emitting diodes (LEDs)—e.g., white LEDs. The backlight may be configured to direct its emission through the LCD matrix, which forms a display image based on control signals from compute system 25. The LCD matrix may include numerous, individually addressable pixels arranged on a rectangular grid or other geometry. In some embodiments, pixels transmitting red light may be juxtaposed to pixels transmitting green and blue light, so that the LCD matrix forms a color image. In other embodiments, a reflective liquid-crystal-on-silicon (LCOS) matrix or a digital micromirror array may be used in lieu of the LCD matrix. Alternatively, an active LED, e-ink, holographic, cathode-ray tube (CRT), or scanned-beam display may be used to form display images. Electronic devices having a near-eye display may incorporate separate right and left display components using any of the technologies described above. Such components may further incorporate beam-turning optics that present each display image as a virtual image admixed with real imagery sighted through the optic. Alternatively, a near-eye display may incorporate a single display panel as described above, but extending over both eyes.

Communication machine 26 of an electronic device 18 may provide wired or wireless network access, such that the electronic device is able to communicate with one or more other electronic devices in display system 12 and/or networked devices external to the display system, including devices accessible over the Internet. Video rendering machine 28 of an electronic device may be configured to render video for the display 22 associated with that device, or, where appropriate, for a display associated with another electronic device of display system 12. The video rendering machine may include a general-purpose microprocessor or graphics-processing unit (GPU), for example. Some electronic devices 18 may also include an inertial measurement unit (IMU) 30 comprising a magnetometer, a gyroscope, and/or an accelerometer. The IMU may be configured to provide ground reference and movement data for the electronic device in which it is installed.

The term 'camera' refers herein to any machine-vision component having at least one optical aperture and sensor array configured to image a scene or subject. Camera 20 of an electronic device 18 may include a flat-imaging monochrome or color camera. In some implementations, the camera may also include a depth-imaging camera. A depth-imaging camera may be configured to acquire a time-resolved sequence of depth maps of a scene or subject. As used herein, the term 'depth map' refers to an array of pixels registered to corresponding regions ($X_i$, $Y_i$) of an imaged scene, with a depth value $Z_i$ indicating, for each pixel, the depth of the corresponding region. 'Depth' is defined as a coordinate parallel to the optical axis of the camera, which increases with increasing distance from the camera. Operationally, a depth-imaging camera may be configured to acquire 2D image data, from which a depth map is obtained via downstream processing. The term 'depth video' refers herein to a time-resolved sequence of depth maps.

The configuration of a depth-imaging camera may differ from one implementation to the next. In one example, brightness or color data from two, stereoscopically oriented imaging arrays in a depth-imaging camera may be co-registered and used to construct a depth map. More generally, depth coordinates into a scene may be obtained using one or more flat-imaging cameras, with optical-tomography based co-registration of imaged features. Hyperspectral flat imaging may be used with this approach, for improved feature discrimination. In other examples, an illumination source associated with the depth-imaging camera may be configured to project onto the subject a structured illumination pattern comprising numerous discrete features—e.g., lines or dots. An imaging array in the depth-imaging camera may be configured to image the structured illumination reflected back from the subject. Based on the spacings between adjacent features in the various regions of the imaged subject, a depth map of the subject may be constructed. In still other examples, the illumination source may project pulsed IR or NIR illumination towards the subject. A pair of imaging arrays in the depth-imaging camera may be configured to detect the pulsed illumination reflected back from the subject. Both arrays may include an electronic shutter synchronized to the pulsed illumination, but the integration times for the arrays may differ, such that a pixel-resolved time-of-flight (ToF) of the pulsed illumination, from the illumination source to the subject and then to the arrays, is discernible based on the relative amounts of light received in corresponding elements of the two arrays.

In some implementations, discrete flat-imaging and depth-imaging cameras may be arranged with parallel optical axes oriented in the same direction. In some implementations, image or video output from the flat-imaging and depth-imaging cameras may be co-registered and combined into a unitary (e.g., RGB+depth) data structure or stream. In examples in which depth-imaging camera is a suitably configured ToF depth-imaging camera, a data stream representing both depth and brightness (e.g., IR+depth) may be available by combining outputs differing in phase.

Figure 3A:
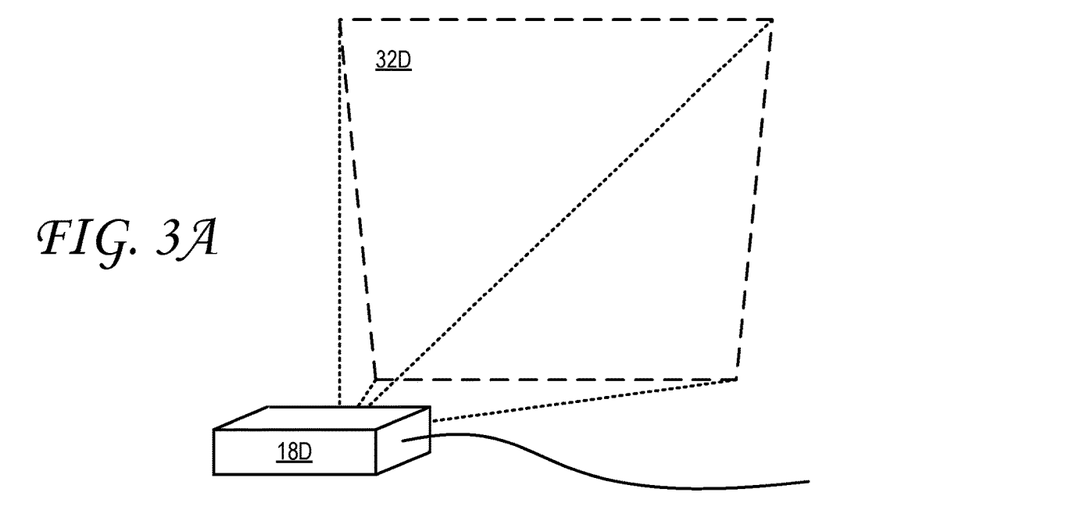
FIGS. 3A and 3B show aspects of additional example display-enabled electronic devices and associated display zones.
Figure 3B:
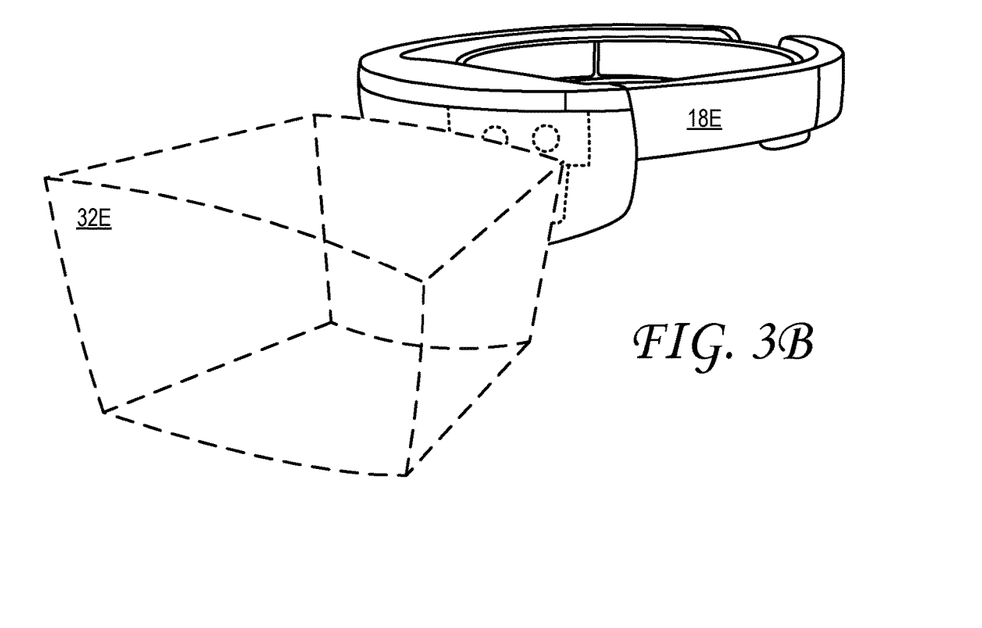

Returning now to FIG. 1, there is associated with every display-enabled electronic device 18 of display system 12 a corresponding display zone 32 (e.g., display zones 32A, 32B, and 32C). FIGS. 3A and 3B show additional display-enabled electronic devices 18D/18E and associated display zones 32D/32E. For electronic devices having a display screen, the display zone coincides with the display screen. For real-image projecting devices, the display zone may be arranged on a wall or other object. For virtual-image projecting devices (including holographic, near-eye displays), the display zone may be a 3D shape positioned in front of the user. In FIG. 3B, electronic device 18E provides both right and left display zones, but only the left display zone is shown in the drawing. In some implementations, a display zone may be curved or irregularly shaped.

In some implementations, camera 20 of a display-enabled electronic device 18 may be used to determine the vantage point of a user 14 with respect to a display zone 32 associated with the device. In the configuration shown in FIG. 4, for instance, electronic device 18 includes an on-axis illumination source 34 and an off-axis illumination source 36. Each illumination source emits infrared (IR) or near-infrared (NIR) illumination in a high-sensitivity wavelength band of camera 20. Compute system 25 may be configured to use the output from the camera to track the gaze axis V of the user, or any other surrogate for the user's vantage point.

Figure 4:
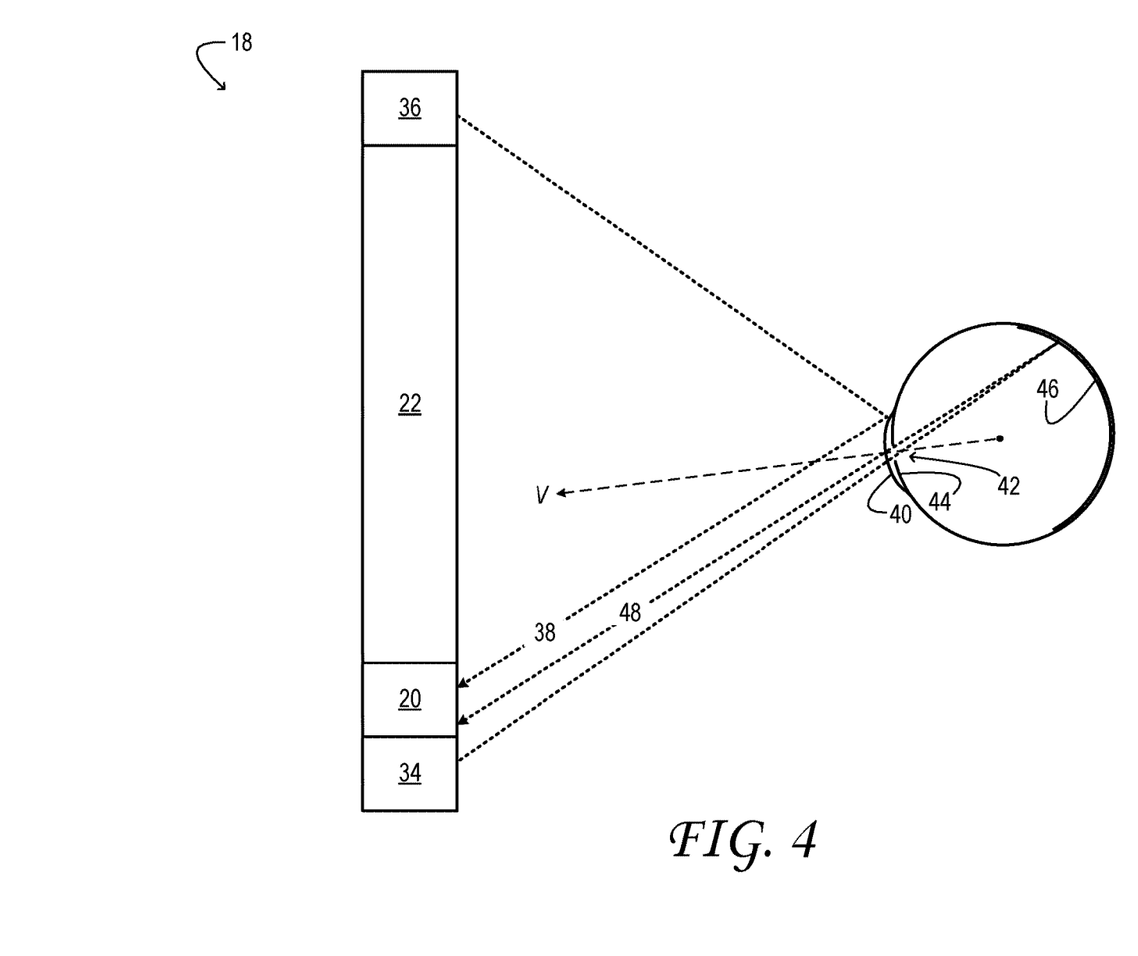
FIG. 4 shows aspects of user vantage-point sensing using a camera of an example electronic device of a display system.

On- and off-axis illumination serve different purposes with respect to gaze tracking. As shown in FIG. 4, off-axis illumination can create a specular glint 38 that reflects from the cornea 40 of the user's eye. Off-axis illumination may also be used to illuminate the eye for a 'dark pupil' effect, where pupil 42 appears darker than the surrounding iris 44. By contrast, on-axis illumination from an IR or NIR source may be used to create a 'bright pupil' effect, where the pupil appears brighter than the surrounding iris. More specifically, IR or NIR illumination from on-axis illumination source 34 illuminates the retroreflective tissue of the retina 46 of the eye, which reflects the light back through the pupil, forming a bright image 48 of the pupil.

Digital image data from camera 20 may be conveyed to associated logic in compute system 25 or in a remote computer system accessible to the compute system via a network. There, the image data may be processed to resolve such features as the pupil center, pupil outline, and/or one or more specular glints from the cornea. The locations of such features in the image data may be used as input parameters in a model—e.g., a polynomial model—that relates feature position to the gaze axis V. In embodiments where a gaze axis is determined for the right and left eyes, the compute system may also be configured to compute the user's focal point as the intersection of the right and left gaze axes. It will be noted that the vantage point may be defined more simply as the locus of the user's eyes or head, when extreme rendering accuracy is not required. In that alternative, a non-imaging (e.g., electrostatic) sensor may be used to determine the user's vantage point relative to a given display zone.

Typically, in a game system, all-in-one PC, laptop, tablet, or smartphone, camera 20 and display zone 32 are fixed mechanically to each other, such that the display zone remains in fixed registry relative to the optical axis of the camera. In a holographic 3D display, right and left display zones are likewise registered to the field of view of the camera. However, as the various electronic devices 18 of display system 12 are generally movable relative to each other, the display zone of a given electronic device (e.g., display zone 32B) will be movable, generally, relative to the camera of any other electronic device (e.g., camera 20A). This feature presents a spatial-registration challenge for any display system that attempts to distribute video among two or more display zones.

Figure 5:
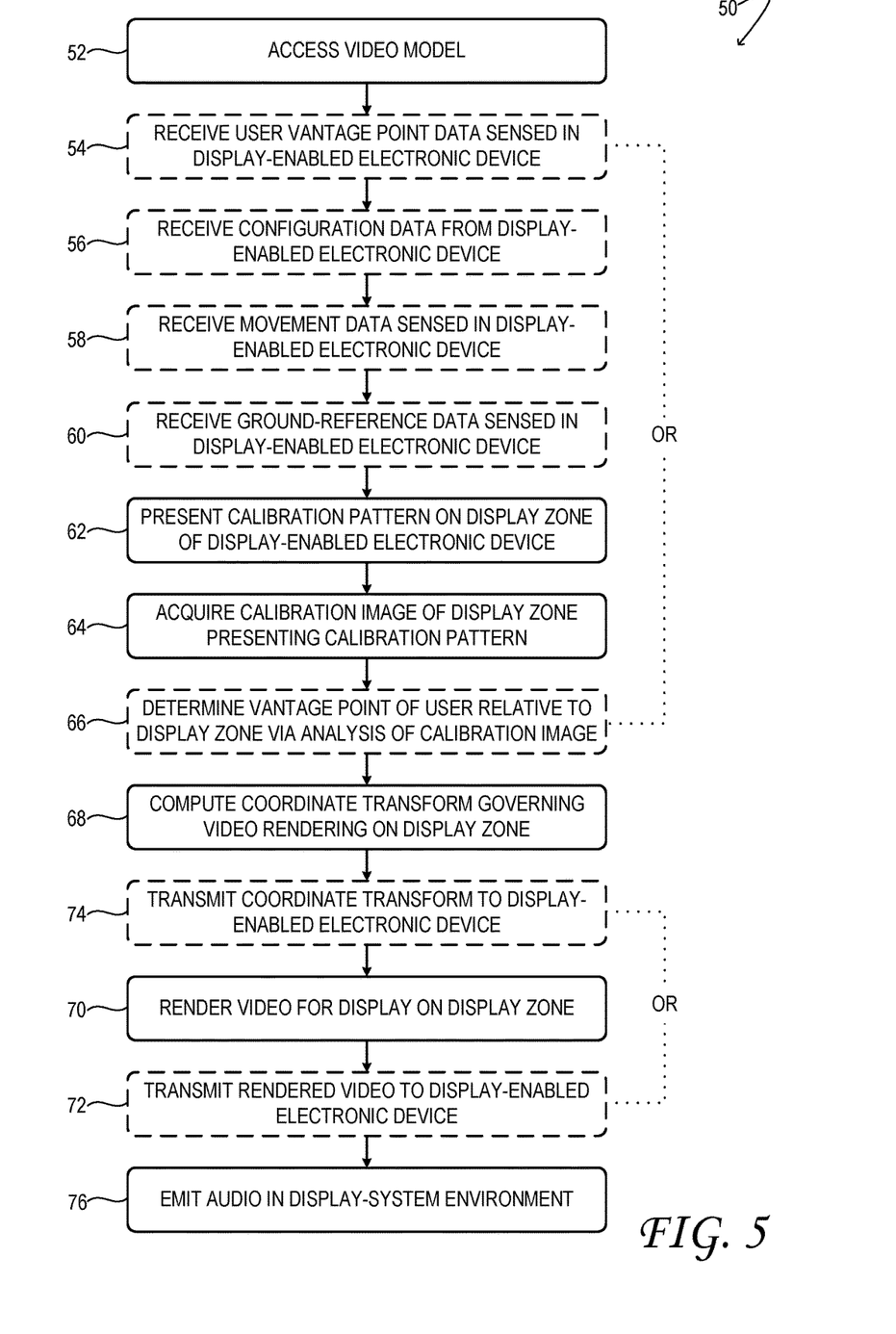
FIG. 5 shows aspects of an example method for distributing video among multiple display zones in a display system.

FIG. 5 illustrates an example method 50 for distributing video among multiple display zones in an environment. The method may be enacted in a display system of multiple electronic devices, as described above. Accordingly, continued reference is made to the configurations described above. It will be noted, however, that the method of FIG. 5 is applicable to other configurations as well.

At 52 of method 50, a video model is accessed by one or more electronic devices 18 of display system 12. The video model defines the content and location of the video to be displayed by the display system. In one very simple example, the video model may establish that a word-processing document window is to be positioned directly in front of the user, and an email window at the periphery of the user's field of view. In other examples, the video model may establish a trajectory along which GUI objects are dragged pursuant to a mouse movement or hand gesture of the user. In still other examples, the video model may define a holographic 3D world by registering one or more virtual objects in that world to coordinates in the user's real environment. In the environment shown in FIG. 1, for instance, the video model may determine the dimensions, form, color, texture, location, conformation, and audio emissions of dragon image 16 within environment 10. The video model may be stored on and/or served from one or more electronic devices 18 of display system 12, or elsewhere on a network, and accessed by one or more electronic devices of the display system. In some implementations, the one or more electronic devices of the display system may construct a new video model during execution of a process (e.g., a game) or otherwise modify a pre-existing video model.

In subsequent acts of method 50, portions of the video model are rendered separately for display on one or more display zones 32 of the display system, based on the dimensions, position, and orientation of the display zones. This approach may be used to provide a highly immersive experience for one or more display-system users. For instance, when the user in one of the above examples drags the GUI object from one point in space to another, it may appear, when seen through the various display zones, to follow the appropriate trajectory. This effect may be experienced regardless of the dimensions, position, or orientation of the display zones, or changes therein. In more sophisticated examples, where a world of virtual imagery is constructed around the user, the various display zones may provide movable (in some cases, handheld) 'windows' into that world. Accordingly, in some implementations, the dimensions, position, and orientation of the various display zones may be updated in real time, and with such frequency that the video displayed thereon remains realistic even as the electronic devices and associated display zones are repositioned.

In some implementations, the video rendered for each of the display zones 32 may be insensitive to the vantage point of the user. That approach may be appropriate for display zones viewable from a limited range of vantage points, or those displaying virtual content located 'deep' into a display zone. In other implementations, however, it may be desirable to modify the video rendering based on the vantage point of the user relative to a nearby display zone. For instance, if a virtual display object is supposed to be directly behind the display zone of a PC monitor, that object should be offset to the right if the user is standing to the left of the monitor, and offset to the left if the user is standing to the right. In method 50, accordingly, the user's vantage point relative to a given display zone is determined in real time. At optional step 54, for instance, data responsive to the user's vantage point relative to a nearby display zone is received from a sensor in the electronic device associated with that display zone. Such data may be received in one or more other electronic devices of the display system—viz., devices responsible for video rendering on the display zone.

Method 50 includes additional, optional steps in which other forms of data are provided by a display-enabled electronic device associated with a given display zone. At 56 configuration data is received from the display-enabled electronic device. The configuration data may include static data defining, for example, the dimensions of the display-zone. At 58 movement data is received from an inertial measurement unit of the display-enabled electronic device—e.g., 3DOF data responsive to change in position or 6OF data responsive to change in position and orientation of the display zone. By integration of the movement data with respect to time, an updated position and/or orientation of the display zone may be computed. At 60 ground-reference data is received from the inertial measurement unit of the display-enabled electronic device. The ground-reference data may be used to determine the directions corresponding to 'horizontal' and 'vertical' in the display-system environment. In implementations in which the display-enabled electronic device renders its own video, the configuration data, movement data, and ground-reference data may be received in the compute machine of that device. In other embodiments, such data may be transmitted from a communication machine of the display-enabled device and received in a communication machine of the electronic device responsible for video rendering to the display zone.

In some technologies, a display system may track the position and orientation of its various display zones primarily via IMU data from its display-enabled devices. Alternatively, every display-enabled device may be equipped with a beacon or other dedicated hardware for tracking position and orientation. This disclosure, by contrast, does not require dedicated positioning hardware in any display-enabled electronic device. Instead, the approach herein is primarily vision-based. The use of IMU and static configuration data is an optional refinement over the vision-based approach.

Figure 6:
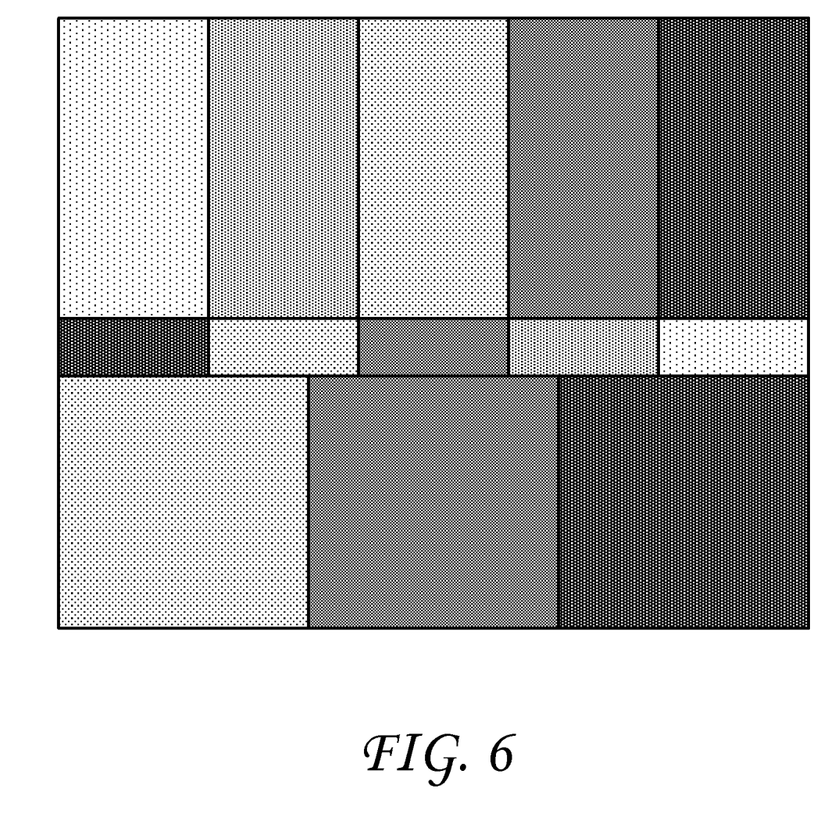
FIG. 6 shows aspects of an example calibration pattern associated with the method of FIG. 5.

Continuing in FIG. 5, at 62 of method 50, a calibration pattern is presented on a given display zone. Presentation of the calibration pattern may be triggered by transmitting to the display-enabled electronic device associated with that display zone either the calibration pattern itself, embedded in the video content rendered for display on the display zone, or a request to render the calibration pattern on the display zone. In implementations in which rendered video is transmitted to the display-enabled electronic device, any suitable casting protocol may be used. Current examples include Miracast (a peer-to-peer wireless casting protocol based on Wi-Fi) and Chromecast (a casting protocol developed by Google, Incorporated of Mountain View, Calif.). In some implementations, the calibration pattern is presented so as to cover the entire display zone of interest, for ease of visibility to camera-enabled electronic devices of the display system. The content of the calibration pattern may be configured to define, with minimal ambiguity, one or more of the dimensions, position, and orientation of the imaged display zone. In one implementation, the calibration pattern may be a pattern of differently colored rectangular boxes, as shown in FIG. 6. The calibration may be presented in the form of a single video frame or consecutive series of M video frames, where M=1, 2, etc. In implementations in which the various display zones are liable to be moved during a video session, the calibration pattern may be repeated periodically, at a predetermined frequency. For instance, the calibration pattern may be inserted into the rendered video, replacing every N to N+M−1 frames of the video, where N=100, 1000, 5000, etc. In some implementations, the calibration pattern may be digitally watermarked into one or more frames of the rendered video, rather than replacing the rendered video.

At 64 a calibration image of the display zone presenting the calibration pattern is acquired optically by a camera of the display system. As noted previously, the display zone captured in the calibration image may be movable relative to the camera, or more specifically, to the field of view of the camera. In some implementations, the captured display zone may be associated with a display-enabled, first electronic device of the display system, while the camera may be associated with a camera-enabled, second electronic device. In this implementation, the camera-enabled electronic device, by analysis of geometric parameters extracted from the calibration image, may determine the dimensions, position, and orientation of the imaged display zone relative to the optical axis of its own camera. In implementations in which the calibration pattern is presented periodically on one or more display zones of the display-enabled electronic devices of display system 12, acquisition of the calibration image may be synchronized to presentation of the calibration pattern. In other implementations, the camera-enabled electronic device may continuously acquire imagery of environment 10 and continuously scan the imagery for a detectable calibration pattern.

In some implementations, the acquired calibration image may include the user as well as one or more display zones. Accordingly, the vantage point of the user relative to the display zone may be determined by analysis of the calibration image, at 66, as an alternative to 54 for configurations in which the display-enabled electronic device has no sensor capable of determining the user's vantage point.

At 68 a coordinate transform governing video rendering on the display zone is computed based on one or more geometric parameters of the calibration pattern as resolved in the calibration image. In general, the coordinate transform may include one or more of a translation operation, a rotation operation, and a scaling operation. In one implementation, the coordinate transform may include an affine transform. In some implementations, the coordinate transform is defined as the transform needed to 'return' the calibration image to the predetermined form and dimensions of the calibration pattern, at a predetermined position and orientation (e.g., original dimensions, normal to and intersecting the optical axis of the camera). Accordingly, the coordinate transform may be responsive to the dimensions, position, and orientation of the imaged display zone relative to the optical axis of the camera. For instance, if the calibration pattern is known to have a long red bar at the top and a series of blue and white blocks on the bottom, but the calibration image includes a similar locus having a long red bar on the right side and a series of blue and white blocks on the left side, then the coordinate transform may include a ninety-degree rotation about an axis normal to the display zone. If the calibration pattern is known to be rectangular, but the calibration image includes a similar locus made up of trapezoids, then the coordinate transform may include a rotation about an axis parallel to the display zone. In some implementations, computing the coordinate transform may include actually determining dimensions, position, and orientation of the display zone in world space—i.e., in the real environment in which the display system is arranged.

In implementations in which the electronic device includes a depth-imaging camera, the calibration image may be a 3D depth image that unambiguously defines the dimensions, position, and orientation of the imaged display zone. Defining the display zone to this extent supports a 6DOF experience for the user viewing the display zone. In contrast, each of the dimensions, position, and orientation derived solely from a flat image may be convoluted by the other two parameters, supporting only a 3DOF user experience. Deconvolution is achievable when one of the parameters is fixed independently (e.g., absolute dimensions reported from the display device as sideband data) or from concurrent measurements made from two different cameras, as described further below. In some implementations, the coordinate transform may be computed in a compute machine associated with the camera-enabled electronic device that acquired the calibration image. In other implementations, the coordinate transform may be remotely computed.

In some implementations, the coordinate transform may be computed further based on the user's vantage point relative to the display zone, for the reasons outlined hereinabove. In some implementations, the coordinate transform may be computed further based on ground-reference and/or movement data from an IMU of the display-enabled electronic device, if available. This refinement may be used to estimate the position and orientation of a display zone which has been occluded by the user or by another object, or has been moved out of the combined fields of view of the cameras of the display system. It will be noted that presentation of a dedicated calibration pattern, while useful, is not strictly necessary in every implementation. In some cases, selected frames of the unmodified video content may serve as the calibration pattern. Such frames may be identified automatically in the acquired calibration image and used to compute the appropriate coordinate transform for a given display zone.

At 70 video is rendered for display on the display zone captured in the calibration image. The rendering may be accomplished in a video rendering machine of the electronic device associated with the display zone or in any other electronic device. The video may be rendered based on the video model accessed or holographic 3D world constructed at 52. In some implementations, rendered video displayed on a given display zone may provide a virtual window into a holographic 3D world. In general, the process of rendering the video is governed by the coordinate transform computed at 68.

In some implementations, the above video rendering may take place in a video rendering machine of the electronic device in which the calibration image was acquired and the coordinate transform computed. Then, at 72, video rendered for display on the display zone based on the coordinate transform is transmitted to the electronic device associated with the display zone. A casting protocol may be used for transmission of the rendered video, as described above. In other implementations, the coordinate transform, at 74 is transmitted to the display-enabled electronic device associated with the display zone, which, at 70 accomplishes its own video rendering. To this end, a communication machine of the electronic device computing the coordinate transform may be configured to transmit the coordinate transform to the communication machine of the display-enabled electronic device. In still other implementations, the video may be rendered on any other networked electronic device having access to the computed coordinate transform.

At 76 audio is emitted in the display-system environment via one or more loudspeakers of the display-enabled electronic devices. The intensity of the audio emitted from a given loudspeaker may be modulated based on the loudspeaker-relative position and orientation of a display zone in the display-system environment. In this way, the user can experience audio that originates from an expected or appropriate locus of the display-system environment, based on the video content being presented by the display system. Returning again to the example of FIG. 1, if the dragon roars during the video, the roar is expected to be louder in the vicinity of display zone 32A (where the dragon's mouth is displayed) than in display zone 32B (where the dragon's tail is displayed). In less fantastic examples, the same methodology can be used to create a high-fidelity 3D soundbar using an ensemble of relatively inexpensive audio-enabled electronic devices. In some implementations, the vantage point of the user relative to the display zone of an audio-enabled electronic device (as determined at 54 or 66) may be used to further modulate the intensity of audio emission from that device. For example, only left-channel audio may be emitted from a device when the user is to the right of that device, and right-channel audio when the user is to the left. When the user is nowhere near an audio-enabled electronic device, sound emission may be cancelled to save power and preserve audio fidelity in the environment. In some implementations, sounds from virtual objects targeted by the user's gaze may be emitted more loudly than sounds from non-targeted objects.

No aspect of method 50 should be understood in a limited sense, for numerous variations, extensions, and omissions are envisaged as well. For example, the captured display zone referred to in the above method may be one of a plurality of display zones resolved in the calibration image. Accordingly, the computing and transmitting acts of 68, 72, and 74 may be enacted for each of the display zones resolved. Further, the camera-enabled electronic device may be one of a plurality of electronic devices of the display-rendering system that cooperate to define the position and orientation of the display zone in world space. In this 'cluster teaming' approach, display- and camera-enabled electronic devices in the display system perform pair-wise co-registration to compute absolute distances and orientations based on triangulated absolute dimensions of the displays. This aspect may also be used to extract the functionality of a stereoscopic depth-sensing camera from two disconnected electronic devices, each equipped with a flat-imaging camera.

For example, display system 12 may include two camera-enabled electronic devices A and B, and device A also may be display-enabled. Furthermore, the camera and display zone of device A may be mechanically coupled to each other—i.e., maintained in fixed registry. Device A may now present a calibration pattern on its display zone, which device B may recognize, through analysis of the calibration image acquired by device B. Based on the calibration image, device B may compute a coordinate transform that (instead of, or in addition to governing video rendering on device A) relates the geometric camera model of device A to the geometric camera model of device B. As a result, any communicatively coupled device in the display system may construct a global camera model in which the scale and optical axis of both cameras are known in the same coordinate system. If the system is able to identify a corresponding image locus in the two calibration images, then all three Cartesian coordinates of that locus may be determined with reference to the global camera model. In this manner, the system may be configured to emulate a stereoscopic depth camera, but without requiring fixed registry of the 'right' and 'left' cameras. On the contrary, the cameras can be moved around the environment in real time, with the global camera model being updated each time a new calibration image is acquired. Naturally, the above description of stereo-camera functionality is extensible to trioptic and higher systems, and may be applied in simultaneous-location-and-mapping (SLAM) applications.

As evident from the foregoing description, the methods and processes described herein may be tied to a compute system of one or more computing devices. In particular, such methods and processes may be implemented as a computer-application program or service, an application-programming interface (API), a library, and/or other computer-program product.

Returning now to FIG. 2, the drawing schematically shows a non-limiting embodiment of a compute system 25 that can enact one or more of the methods and processes described above. Compute system 25 is shown in simplified form. Compute system 25 may be instantiated in one or more personal computers, server computers, tablet computers, home-entertainment computers, network computing devices, gaming devices, mobile computing devices, mobile communication devices (e.g., smartphone), near-eye display devices, and/or other computing devices.

Compute system 25 includes a logic machine 78 and a computer memory machine 80. Compute system 25 is operatively coupled to display 22, input or sensory subsystem 82, communication machine 26, and/or other components not shown in the drawings.

Logic machine 78 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Computer memory machine 80 includes one or more physical devices configured to hold instructions executable by the logic machine to implement the methods and processes described herein. When such methods and processes are implemented, the state of computer memory machine 80 may be transformed—e.g., to hold different data.

Computer memory machine 80 may include removable and/or built-in devices. Computer memory machine 80 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Computer memory machine 80 may include volatile, nonvolatile, dynamic, static, read/write, read-only, random-access, sequential-access, location-addressable, file-addressable, and/or content-addressable devices.

It will be appreciated that computer memory machine 80 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 78 and computer memory machine 80 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of compute system 25 implemented to perform a particular function. In some cases, a module, program, or engine may be instantiated via logic machine 78 executing instructions held by computer memory machine 80. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

Display 22 may be used to present a visual representation of data held by computer memory machine 80. This visual representation may take the form of a graphical user interface (GUI). As the herein described methods and processes change the data held by the storage machine, and thus transform the state of the storage machine, the state of display 22 may likewise be transformed to visually represent changes in the underlying data. Display 22 may include one or more display devices utilizing virtually any type of display technology, as noted above. Such display devices may be combined with logic machine 78 and/or computer memory machine 80 in a shared enclosure, or such display devices may be peripheral display devices.

Input or sensory subsystem 82 may comprise or interface with one or more user-input devices such as a keyboard, mouse, touch screen, or game compute system. In some embodiments, the input or sensory subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

Communication machine 26 may be configured to communicatively couple compute system 25 with one or more other computing devices. Communication machine 26 may include wired and/or wireless communication devices compatible with one or more different communication protocols. As non-limiting examples, the communication machine may be configured for communication via a wireless telephone network, or a wired or wireless local- or wide-area network. In some embodiments, the communication machine may allow compute system 25 to send and/or receive messages to and/or from other devices via a network such as the Internet.

One aspect of this disclosure is directed to a method for distributing video among multiple display zones movable with respect to each other. The method comprises: optically acquiring with the camera a calibration image of a display zone of a display-enabled electronic device; computing, based on the calibration image, a coordinate transform responsive to dimensions, position, and orientation of the display zone relative to the camera, the coordinate transform being usable to effect video rendering on the display zone; and transmitting to the display-enabled electronic device one or more of the coordinate transform and video rendered for display on the display zone based on the coordinate transform.

In some implementations, the method further comprises rendering the video for display on the display zone. In some implementations, the method further comprises accessing a video model, wherein the video is rendered based on the video model. In some implementations, the video model represents a holographic 3D world, and the display zone is a virtual window into the holographic 3D world. In some implementations, the method further comprises presenting a calibration pattern on the display zone before acquiring the calibration image. In some implementations, the method further comprises receiving configuration data from the display-enabled electronic device, wherein the coordinate transform is computed further based on the configuration data. In some implementations, the method further comprises determining a vantage point of the user relative to the display zone, wherein the coordinate transform is computed further based on the vantage point. In some implementations, the method further comprises receiving data defining the vantage point as sensed in the display-enabled electronic device. In some implementations, the vantage point is determined by analysis of the calibration image. In some implementations, the method further comprises receiving movement data from an inertial measurement unit of the display-enabled electronic device, wherein the coordinate transform is computed further based on the movement data. In some implementations, the method further comprises receiving ground-reference data from an inertial measurement unit of the display-enabled electronic device, wherein the coordinate transform is computed further based on the ground-reference data. In some implementations, the display zone is one of a plurality of display zones of corresponding display-enabled electronic devices resolved in the calibration image, and said computing and transmitting are enacted for each of the display zones resolved. In some implementations, computing the coordinate transform includes determining dimensions, position, and orientation of the display zone in an environment of the display system based on a geometry of the calibration pattern as resolved in the calibration image. In some implementations, the camera is arranged in a camera-enabled electronic device, separate from the display-enabled electronic device. In some implementations, the camera-enabled electronic device is one of a plurality of electronic devices of the display system that cooperate to define the dimensions, position, and orientation of the display zone. In some implementations, the method further comprises emitting audio in the environment, wherein an intensity of the audio emitted from a locus of the display zone is modulated based on the position and orientation of the display zone.

Another aspect of this disclosure is directed to a display system for distributing video among multiple display zones movable with respect to each other. The display system comprises: a camera configured to optically acquire a calibration image of a display zone of a display-enabled electronic device; a compute machine configured to compute, based on the calibration image, a coordinate transform responsive to dimensions, position, and orientation of the display zone relative to the camera, and usable to effect video rendering on the display zone; and a communication machine configured to transmit to the display-enabled electronic device one or more of the coordinate transform and video rendered for display on the display zone based on the coordinate transform. In some implementations, the camera is a depth-imaging camera, and the calibration image is a 3D depth image.

Another aspect of this disclosure is directed to a display-enabled electronic device comprising: a display with an associated display zone; a communication machine configured to receive a coordinate transform responsive to dimensions, position, and orientation of the display zone relative to a camera, the coordinate transform being computed based on a calibration image of the display zone optically acquired by the camera and usable to effect video rendering on the display zone; and a video rendering machine configured to render video on the display zone based on the coordinate transform. In some implementations, the display-enabled electronic device further comprises an inertial measurement unit arranged in the display-enabled electronic device and configured to provide ground reference and movement data for the display-enabled electronic device, wherein the coordinate transform is computed further based on the ground reference and/or movement data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a display system equipped with at least one camera, a method for distributing video, comprising:
   optically acquiring with the camera a calibration image of a display zone of a display-enabled electronic device, the display zone being one of a plurality of independently movable display zones of the display system, the display-enabled electronic device being configured to display distributed video in the display zone;
   computing, based on the calibration image, a coordinate transform responsive to dimensions, position, and orientation of the display zone relative to the camera, the coordinate transform being usable to effect video rendering on the display zone; and
   transmitting to the display-enabled electronic device one or more of the coordinate transform and video rendered for display on the display zone based on the coordinate transform.

2. The method of claim 1 further comprising rendering the video for display on the display zone.

3. The method of claim 2 further comprising accessing a video model, wherein the video is rendered based on the video model.

4. The method of claim 3 wherein the video model represents a holographic 3D world, and wherein the display zone is a virtual window into the holographic 3D world.

5. The method of claim 1 further comprising presenting a calibration pattern on the display zone before acquiring the calibration image.

6. The method of claim 1 further comprising receiving configuration data from the display-enabled electronic device, wherein the coordinate transform is computed further based on the configuration data.

7. The method of claim 1 further comprising determining a vantage point of the user relative to the display zone, wherein the coordinate transform is computed further based on the vantage point.

8. The method of claim 7 further comprising receiving data defining the vantage point as sensed in the display-enabled electronic device.

9. The method of claim 7 wherein the vantage point is determined by analysis of the calibration image.

10. The method of claim 1 further comprising receiving movement data from an inertial measurement unit of the display-enabled electronic device, wherein the coordinate transform is computed further based on the movement data.

11. The method of claim 1 further comprising receiving ground-reference data from an inertial measurement unit of the display-enabled electronic device, wherein the coordinate transform is computed further based on the ground-reference data.

12. The method of claim 1 wherein the display zone is one of a plurality of display zones of corresponding display-enabled electronic devices resolved in the calibration image, and wherein said computing and transmitting are enacted for each of the display zones resolved.

13. The method of claim 1 wherein computing the coordinate transform includes determining dimensions, position, and orientation of the display zone in an environment of the display system based on a geometry of the calibration pattern as resolved in the calibration image.

14. The method of claim 13 wherein the camera is arranged in a camera-enabled electronic device, separate from the display-enabled electronic device.

15. The method of claim 14 wherein the camera-enabled electronic device is one of a plurality of electronic devices of the display system that cooperate to define the dimensions, position, and orientation of the display zone.

16. The method of claim 14 further comprising emitting audio in the environment, wherein an intensity of the audio emitted from a locus of the display zone is modulated based on the position and orientation of the display zone.

17. A display system for distributing video, comprising:
   a camera configured to optically acquire a calibration image of a display zone of a display-enabled electronic device, the display zone being one of a plurality of independently movable display zones of the display system, the display-enabled electronic device being configured to display distributed video in the display zone;
   a compute machine configured to compute, based on the calibration image, a coordinate transform responsive to dimensions, position, and orientation of the display zone relative to the camera, and usable to effect video rendering on the display zone; and
   a communication machine configured to transmit to the display-enabled electronic device one or more of the coordinate transform and video rendered for display on the display zone based on the coordinate transform.

18. The display system of claim 17 wherein the camera is a depth-imaging camera, and wherein the calibration image is a 3D depth image.

19. A display-enabled electronic device of a display system, the display-enabled electronic device comprising:
   a display with an associated display zone, the display zone being one of a plurality of independently movable display zones of the display system, the display-enabled electronic device being configured to display distributed video in the display zone;
   a communication machine configured to receive a coordinate transform responsive to dimensions, position, and orientation of the display zone relative to a camera, the coordinate transform being computed based on a calibration image of the display zone optically acquired by the camera and usable to effect video rendering on the display zone; and
   a video rendering machine configured to render video on the display zone based on the coordinate transform.

20. The display-enabled electronic device of claim 19 further comprising an inertial measurement unit arranged in the display-enabled electronic device and configured to provide ground reference and movement data for the display-enabled electronic device, wherein the coordinate transform is computed further based on the ground reference and/or movement data.

* * * * *